United States Patent Office 2,872,928
Patented Feb. 10, 1959

2,872,928

MEANS AND METHODS FOR EXTRACTING FROM TOBACCO SMOKE DELETERIOUS INGREDIENTS

John Ross, Mount Vernon, N. Y., assignor to Combustion Research, Inc., New York, N. Y., a corporation of New York No Drawing. Application November 8, 1957
Serial No. 695,236

6 Claims. (Cl. 131—208)

This invention relates to means and methods for extracting from tobacco smoke deleterious ingredients including suspected carcinogenic substances.

Cigarette smoke is shown to contain quantities of minute particles of tars and nicotine. These particles give the tobacco smoke its characteristic aroma and flavor, and also represent the stimulants, irritants, and the suspected cancer-causing or carcinogenic agents responsible for the fundamental tobacco health problem.

Various attempts have been made to remove at least some of these stimulants, irritants, and suspected cancer-causing agents through the use of filters of one type or another, which have been applied to the mouth end of the cigarettes. Many of these filters are essentially a complex maze of microscopic traps and barriers which are designed to mechanically prevent the passage of a certain percentage of these smoke particles.

A more effective filter would be one that could particularly reduce the amount of deleterious ingredients including suspected carcinogenic agents in the smoke without unduly reducing the flavor and aroma thereof.

It is, therefore, an object of the present invention to provide a chemically treated trap or filter barrier that will effectively prevent the passage of a substantial quantity of the deleterious ingredients in the tobacco smoke.

Another object of the present invention is to provide a chemically active trap or filter for isolating such deleterious ingredients from the other constituents of tobacco smoke.

A still further object of this invention is to provide a chemically active trap or filter, the chemical of which will complex with at least some of the deleterious ingredients of the tobacco smoke to effectively prevent them from reaching the smoker.

An additional object of the present invention is to provide a chemical composition for extracting deleterious substances from tobacco and tobacco smoke.

It is a well known fact that tobacco smoke includes aromatic hydrocarbons, and other chemicals, that are believed to be carcinogenic to animals, and, presumably also to man.

An application of the invention is the use of desoxycholic acid or any of its salts as, or incorporated in, filter material in cigarettes, pipes and cigars, to form a chemically treated filter; another application is the use of the desoxycholic acid and its salts in crystalline form as a chemically active trap in cigars, cigarettes and pipes, etc.

This invention provides a chemically active trap or filter for removing the desired proportions of the deleterious substances from smoke before the smoke reaches the smoker. It contemplates the use of desoxycholic acid as an agent for intercepting and combining with a substantial quantity of the deleterious ingredients of tobacco smoke.

Desoxycholic acid, which is harmless to man, is unique in possessing a remarkable affinity for hydrocarbons, to form stable molecular compounds. Without attempting to offer a chemical explanation for the formation of these compounds, the formation thereof is a fact, and these compounds have been given the name of choleic acids.

The base material upon which the desoxycholic acid is impregnated will make little difference in the efficiency of the filter so long as the compound does not complex with the base material.

A softening agent, such as propylene glycol or other suitable substance, is particularly useful for preventing the compound which is absorbed by or adsorbed on the base material from brushing off or from being entrained in the stream of tobacco smoke.

The amount of the desoxycholic acid used in the filter material may vary to suit specific needs.

The desoxycholic acid can be conveniently applied to the base material in a solution form that also contains the softening agent. One example of a solution suitable for this purpose, when used with fibrous filters, is, by weight:

1% sodium desoxycholate
4% softening agent
95% water

If silica gel be used as the filter base, then the softening agent may be omitted.

It is to be understood that the above stated composition is not intended to limit this invention to the proportions for materials specifically stated, which can be varied within wide limits, as they depend upon the amount of deleterious substance to be filtered out of the smoke and the filter material used. Furthermore, the reference to "smoke" is intended to mean all products of combustion, and noxious gases, and the reference to "desoxycholic acid" is intended to include the acid and any of its salts, the necessary concentration of this substance in solution and the amount of such substance absorbed by the filter base material also being variable within wide limits depending upon the end results desired.

Having thus described my invention, what I claim as new and desire to secure by Letters Patent, is:

1. A filter or trap for removing deleterious hydrocarbons from tobacco smoke comprising in combination a filter medium, a softening agent and a member selected from the group consisting of desoxycholic acid and its salts, said member being in substantially anhydrous condition, whereby to fix said hydrocarbons in the solid state, in the form of choleic acids.

2. A filter or trap for removing deleterious hydrocarbons from tobacco smoke comprising any of the group consisting of desoxycholic acid and its salts in crystalline form, whereby to fix said hydrocarbons in the solid state, in the form of choleic acids.

3. As an article of manufacture, a desoxycholate-impregnated fibrous mass in a dry state for use as a filter for tobacco smoke whereby to fix hydrocarbons in the smoke stream in the form of choleic acids.

4. A trap for the removal from tobacco smoke of deleterious hydrocarbons, comprising in combination a filter medium and a material chosen from the group consisting of desoxycholic acid and its salts, said material being in substantially dry form, so as to fix said hydrocarbons in the solid state, in the form of choleic acids.

5. A trap for the removal from tobacco smoke of deleterious hydrocarbons, comprising in combination a filter medium and a desoxycholate, substantially in dry form, so as to fix said hydrocarbons in the solid state, in the form of choleic acids.

6. A trap for the removal from tobacco smoke of deleterious hydrocarbons, comprising in combination a filter medium and desoxycholic acid, substantially in dry form, so as to fix said hydrocarbons in the solid state, in the form of choleic acids.

(References on following page)

References Cited in the file of this patent

UNITED STATES PATENTS

| | | |
|---|---|---|
| 2,371,389 | Goepp | Mar. 13, 1945 |
| 2,754,829 | Hess | July 17, 1956 |
| 2,798,850 | Voightman et al. | July 9, 1957 |

FOREIGN PATENTS

| | | |
|---|---|---|
| 201,558 | Australia | Apr. 18, 1956 |

OTHER REFERENCES

Fieser and Fieser: (Text) Organic Chemistry, pub. by Reinhold Publishing Corp., New York, 1956, 1110 pages. Pages 782, 783 and 784 especially cited.

Ekwall et al.: "Aqueous Solutions of Steroid Hormones," (pub.) Acta Endocrinologica, vol. 4: Fasc. II, May 1950. Pages 179–191, pages 179, 181 and 182 especially cited.